Feb. 21, 1933.  J. C. FEDERLE  1,898,766
LIQUID LEVEL INDICATOR
Filed April 17, 1922  2 Sheets-Sheet 1
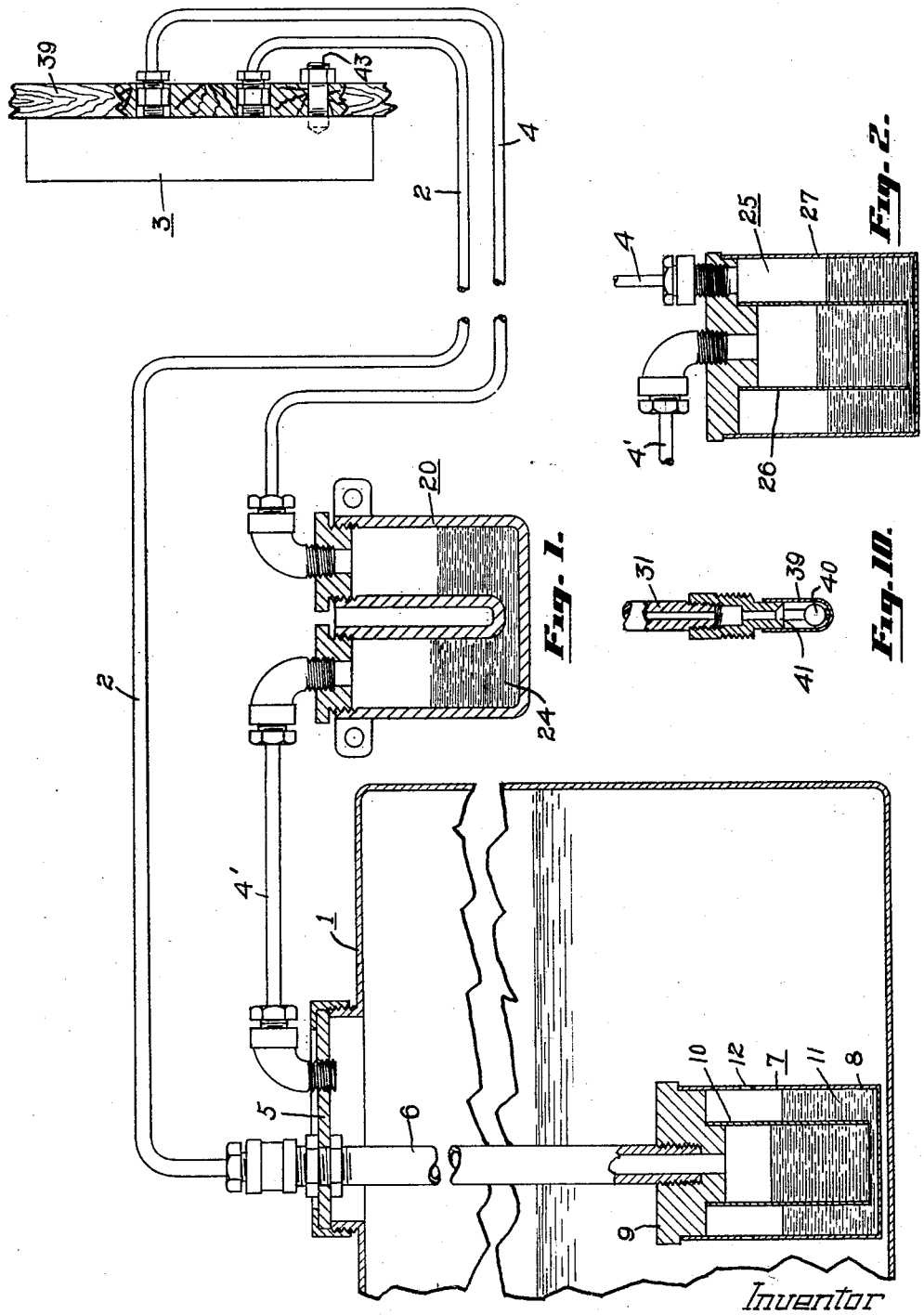

Feb. 21, 1933.  J. C. FEDERLE  1,898,766
LIQUID LEVEL INDICATOR
Filed April 17, 1922  2 Sheets-Sheet 2
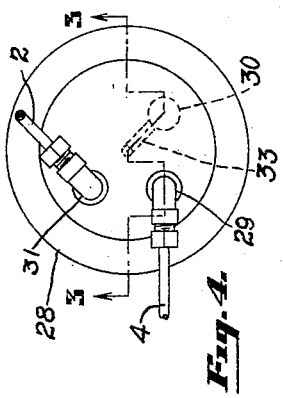
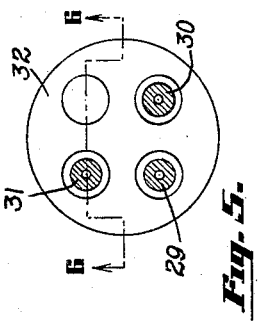
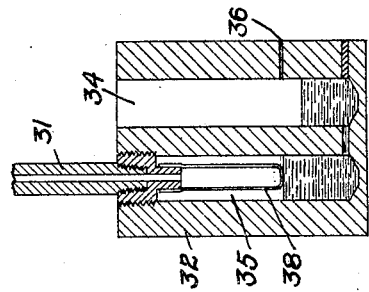
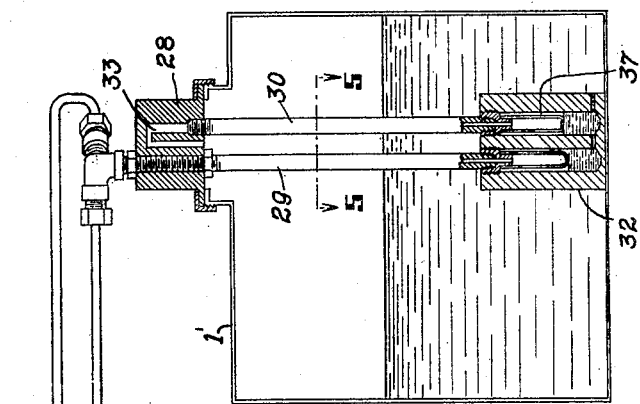
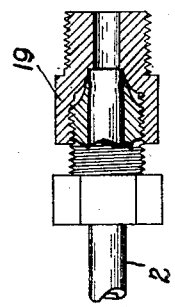
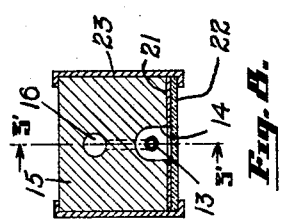
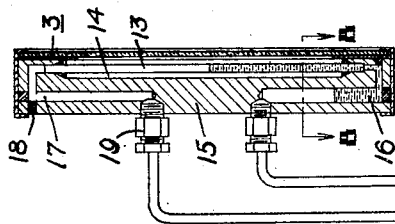
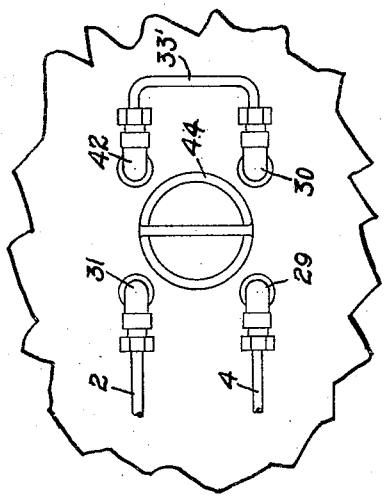
Inventor
Joseph C. Federle
By J. Ralph Fehr
Attorney Patented Feb. 21, 1933

1,898,766

UNITED STATES PATENT OFFICE

JOSEPH C. FEDERLE, OF DAYTON, OHIO

LIQUID LEVEL INDICATOR

Application filed April 17, 1922. Serial No. 554,058.

This invention relates to indicating devices of the type adapted to indicate the quantity of a liquid contained in a vessel, and is particularly adapted for use on motor vehicles to indicate the amount of fuel in the fuel tank.

An object of my invention is to provide a remote-reading indicating device which is adapted to indicate correctly the liquid contents of a vessel under all conditions of temperature to which the indicating device may be exposed in use. On motor vehicles where the fuel tank is located at the rear or in some other out-of-the-way place, it is common practice to employ either a gravity system, a pressure system, or a vacuum system to convey the fuel to the engine, and when the present invention is used in such systems, compensating means is provided so that the indicating device will not be influenced by variations in pressure within the system, as in prior indicating devices, but on the contrary, will register the true amount of fuel in the tank under all conditions of pressure and temperature to which the fuel tank and the indicating device may be subject to in use.

Another object of the present invention is to provide an indicating device having pressure and compensating lines containing substantially equal volumes of entrapped air and to insure equal conditions of temperature for the pressure and compensating lines by laying them alongside of one another or in contact with one another throughout their length.

A still further object of the present invention is to so arrange the indicating device that it may be readily applied to existing fuel tanks by merely removing the gauge ordinarily found thereon and inserting the pressure and compensating lines of the present invention.

The above and other objects of the present invention will become apparent from a detailed description of the accompanying drawings in which—

Fig. 1 illustrates one form of the present invention in elevation, the pressure and compensating cups being in section to more clearly illustrate the invention;

Fig. 2 is a vertical sectional view of a modified form of compensating cup;

Fig. 3 is a view similar to Fig. 1, showing a sectional view on the line 3—3 of Fig. 4, of the pressure and compensating cups arranged as a unitary fuel tank assemblage and a vertical section of the pressure gauge on the line 3'—3' of Fig. 8;

Figs. 4, 5, and 6 are details of the fuel tank assemblage shown in Fig. 3, Fig. 5 being a cross section on the line 5—5 of Fig. 3, and Fig. 6 a section on the line 6—6 of Fig. 5;

Fig. 7 is a detail view of a coupling;

Fig. 8 is a cross section on the line 8—8 of Fig. 3;

Fig. 9 shows a third form of the present invention; and

Fig. 10 shows a detail of construction.

Referring to the drawings, 1 is a fuel tank connected by pressure line 2 with pressure gauge 3 which is adapted to indicate the height or amount of fuel in the tank. A compensating line 4, 4' is also connected between the pressure gauge and the fuel tank for a purpose to be hereinafter described.

In the form of apparatus shown in Fig. 1, tank 1 is provided with an opening having a removable cover 5 which carries the fuel tank end of the pressure line 2, comprising, as shown, a vertical pipe 6 passing through the cover 5 and secured thereto in any suitable manner and having at its lower end a pressure cup, indicated generally at 7. This pressure cup is located near or in contact with the bottom of the fuel tank and comprises a cylindrical cup member 8 closed at its upper end by a head 9 from which is supported, in concentric relation, a tubular member 10 extending downwardly to within a short distance of the bottom of the cup member, to divide the cup member into inner and outer chambers. The inner chamber communicates with the pressure line 2 through the tube 6 and with the outer chamber through an opening between the lower end of the member 10 and the bottom of the cup member 8, which latter contains a quantity of sealing liquid 11 to seal the opening and trap the air in the pressure line. A series of openings 12 in the wall of the cup member 8 above the level of the liquid seal 11 serve to establish communication between the outer chamber and the fuel tank. When fuel is placed in the tank the pressure thereof on the surface of the liquid seal in the outer chamber causes the liquid to rise in the inner chamber, thereby compressing the air trapped in the pressure line and causing a corresponding indication on the gauge 3.

The construction of the pressure gauge 3, which will now be described, is best illustrated in Figs. 3 and 8, in which a sight tube 13 mounted in a depression 14 in the front face of the block 15 is connected by suitable passages 16 and 17 with the pressure and compensating lines 2 and 4 respectively. Suitable couplings 19, such as illustrated on an enlarged scale in Fig. 7, are provided for connecting the pressure and compensating lines with the gauge or other parts of the apparatus, such a coupling forming a solderless air-tight joint capable of being quickly connected or disconnected. This is a feature of considerable importance where the gauge is shipped in knocked-down condition and is to be assembled and attached to the vehicle by inexperienced persons. The passages 16 and 17, as herein illustrated, are formed by drilling the block 15 and then plugging the openings to the outside by plugs 18. The front of the gauge is provided with a scale member 21 graduated in gallons or otherwise and provided with an elongated slot therein through which the sight tube may be read. The entire front face is then covered with a glass 22 which is secured in position by means of a cover 23. The U-shaped passage formed by the lower passage 16 and the sight tube 13 contains an indicating liquid which is preferably colored to facilitate reading and which will not volatilize under normal conditions of use.

As already stated the upper passage 17 of the pressure gauge is connected at one end with the compensating line, and the latter is connected at the other end with the fuel tank. The compensating line is provided with a compensating cup, the construction and principle of which may be best understood upon reference to Fig. 1. The compensating cup referred to generally at 20 consists of a U-shaped member which is located near the fuel tank, and, where the fuel tank is at the rear of the motor vehicle, the compensating cup 20 is fastened underneath the body of the vehicle adjacent to the fuel tank 1. The compensating cup 20, like the pressure cup 7, contains a quantity of sealing liquid 24 which serves to trap a volume of air in the compensating line 4, between the compensating cup 20 and the pressure gauge 3. At this point it would be well to state that the volume of air trapped in the compensating line is substantially equal to the volume of air in the pressure line. The pressure and compensating lines are laid substantially parallel to one another throughout their length, or, preferably, in contact with one another so that they will be subject to the same temperature conditions throughout.

The primary function of the compensating line 4, 4' is to compensate for variations of air pressure on the surface of the liquid in tank 1, which variations are transmitted to and incorrectly influence the indications of gauge 3, whether such variations be merely the result of changing barometric pressures on the surfaces of the liquid, or the result of connecting the gauge in a fuel system of the pressure or of the vacuum type. A further function of the compensating line is to compensate for the expansion and contraction and consequent variation in pressure, of the air in the pressure line resulting from the changing temperatures to which the apparatus is exposed in use, such variations in pressure being transmitted to the gauge 3 to cause an indication too high in summer and too low in winter.

The compensating cup or U passage 20 provides this compensation by trapping in the compensating line a volume of air which expands and contracts equally with the air trapped in the pressure line to oppose the effect of temperature changes in the latter, and since the volumes in the two lines are equal the compensating line exactly neutralizes the effect of temperature changes in the pressure line. The pressure cup 7 and the compensating cup 20 have the further important advantage that, since they completely seal the lines, and the sealing liquid which they contain (glycerine) is immiscible with the gasoline in the tank 1, and does not readily evaporate or absorb air, the system is protected from the further errors that would otherwise follow as a result of the gradual absorption of the air of pressure line 2 by the gasoline or other liquid contained in tank 1, or as a result of the vapor pressure of that liquid acting unequally on the two lines if both were not sealed or if they were sealed with different liquids, or as a result of the mutual miscibility or absorption between the indicating liquid in gauge 3, the liquid in the tank 1 and the air in the lines. In view of the foregoing it will be apparent that variations and inaccuracies in the pressure gauge readings due to variations in temperature of the pressure line 2 are entirely eliminated and compensated for by the compensating line 4.

One side of the compensating cup 20 is in communication with the interior of the fuel tank through the short section of the line 4', as shown in Fig. 1, whereby it will be subject to the same conditions of air pressure within the fuel tank as the pressure cup 7. The arrangement and the proportion of the parts is such that any air pressure in the fuel tank other than atmospheric, which would tend to disturb the indication of the pressure gauge is compensated for by a corresponding pressure on the surface of the liquid in the compensating cup the effect of the air pressure in the tank. It will be understood, of course, that if the fuel tank is vented so that the air pressure therein is always atmospheric, then the short section 4' of the compensating line may be disconnected from the fuel tank or omitted altogether, it being required only that the side of the compensating cup to which it is connected be exposed to atmospheric air pressure.

A form of compensating cup 25 which may be used in place of cup 20 is shown in Fig. 2. It is similar in construction to the pressure cup 7 of Fig. 1, and has a tubular member 26 arranged within a cylindrical cup member 27 to form concentric inner and outer chambers. Here again the volumes and surfaces are such that when it is combined with the pressure cup 7 in Fig. 1, the proper compensation will be obtained, as above described.

From the foregoing description of the operation of the invention it will be apparent that the compensating cup 20 may be placed in any convenient position near the fuel tank where it is exposed to substantially the same conditions as the pressure cup 7 and the adjacent section of the pressure line 2. In fact, it may even be placed inside the fuel tank with the pressure cup 7 without in any way modifying its function. In Figs. 3 to 6 there is shown such an arrangement, the two cups being combined into a unitary structure which will now be described. The cap or cover 28 is connected by the tubes 29, 30, and 31 with the block or member 32 containing the pressure and compensating cups. The U-shaped compensating cup 37, as shown in Fig. 3, is connected to pressure line 4 by pipe 29 and to the interior of the fuel tank by means of pipe 30, having at its upper end an inverted U-shaped passage 33 formed in the cover 28. The purpose of this passage is to prevent fuel from splashing into the open end of pipe 30 and running down into compensating cup where it may disturb the indication of the pressure gauge. The pressure cup is shown in Fig. 6 and has an open chamber 34 communicating with the fuel tank and a closed chamber 35 connected by means of pipe 31 with the pressure line 2. A lateral opening 36 provides communication between the chamber 34 and the fuel tank when the fuel level is below the open end of chamber 34.

The arrangement of the pressure and compensating cups in rigid spaced relation to the cover 28, as above described, constitutes a convenient fuel tank assemblage which may be shipped as a unitary structure, inserted in the fuel tank through an opening at the top and secured in place ready for use. To prevent spilling of the sealing liquid, which is placed in the cups before shipment, the open chamber 34 is provided with a plug which is removed before the assemblage is inserted into the tank. Opening 36 is so small that the sealing liquid cannot escape through it due to its capillary action. To guard against any of the sealing liquid getting up into the tubes 29, 30, and 31 during shipment, and subsequently remaining there owing to capillary attraction, each of these tubes is provided at its lower end with a bag 38 of silk or other soft flexible material which is impervious to the sealing liquid which, at the same time, offers no resistance to the free movement of the sealing liquid level. In Fig. 10, there is shown valve-like means for accomplishing the same result, consisting of a cage member 39 carrying a ball 40 and adapted to engage a seat 41 to cover the end of the tube 31 whenever the cup to which it is applied is tilted on its side or inverted, as might readily occur in shipment. It is to be understood that the means herein shown for preventing the entrance of sealing liquid into the tubes is not limited in application to the form of invention shown in Fig. 3, but may be applied with equal facility in the other forms thereof.

The pressure gauge 3 may also be shipped assembled by plugging the couplings 19 to prevent excessive movement and perhaps loss of the indicating liquid in transit. By simply removing the plugs and securing the gauge to the cowl 39 or any other convenient part of the vehicle, as by means of fastening device 43, and then connecting it with the fuel tank assemblage, which has been previously placed in position as above described, the apparatus will be ready for use. Before the tank is filled with fuel it is generally necessary to make slight adjustments of the air volume in the pressure and compensating lines so that the gauge will read zero when the tank is empty. This may be done by loosening one of the couplings 19 at the gauge so as to permit excess air to escape from one of the lines, after which all joints with the pressure and compensating lines may be covered with shellac or other suitable material as an additional precaution against air leakage. Or, in assembling, all screw-threaded joints may be first covered with a coat of shellac for a purpose well known to those skilled in the art.

In addition to preventing the escape of the volume of air entrapped in the pressure and compensating lines, it is important that precaution be taken to prevent its absorption by the sealing liquid. This may be accomplished by employing as a sealing liquid glycerine or other suitable liquid immiscible with both the fuel and the entrapped air. Glycerine has the advantage, also, that it does not freeze readily nor does it have a vapor pressure of sufficient magnitude to disturb the indications on the pressure gauge.

The preferred indicating liquids may be tetrachlorethylene, acetylene tetrabromine, or other suitable liquid of proper specific gravity which does not freeze at the temperatures to which the gauge is exposed in service. The indicating liquids mentioned, which are compounds of elements of the halogen group, are found to be particularly well adapted for use in the present device owing to their low freezing points, lightness of weight which provides an indicating column of sufficient length, fastness of color, and low vapor tension as compared with alcohol and other light weight liquids which are apt to evaporate and frequently liquefy in other parts of the apparatus.

Fig. 9 shows an arrangement of the present invention which may be used when the fuel tank has but a single opening, viz, a filler opening as at 44. In such a case four holes are made in the tank and the parts of the gauge inserted through the filler opening in the following manner. The pressure cup and pipe 31 are inserted in the tank through opening 44 in assembled relation after which the pipe 31 is projected through one of the four openings and made fast to the tank and to the pressure line 2. Likewise, the compensating cup with pipes 29 and 30 attached is put in place and the pipe attached to compensating line 4 and to the short pipe 33', respectively, the latter corresponding to the passage 33 in Fig. 3, and opening into the tank at 42, as illustrated.

While in the drawings the pressure cup is shown inserted through one of the existing openings in the fuel tank, wherever that opening may be, it is obviously preferable to locate the pressure cup at the center of the bottom portion of the tank, at which point the depth of fuel is least affected by tilting of the fuel tank, and in practice the pressure gauge is so located wherever feasible to do so.

While the forms of mechanism herein shown and described constitute preferred embodiments of one form of the invention, it is to be understood that other forms might be adopted and various changes and alterations made in the shape, size, and proportion of the elements therein without departing from the spirit and scope of the invention.

What is claimed is as follows;

1. The combination with a tank adapted to contain a liquid, an indicating device adapted for remote installation and having a differential pressure responsive element, a pressure gas conduit containing a body of gas and connecting the tank and the indicating device, one end of said pressure gas conduit communicating gas pressure to said pressure responsive element and the other end communicating with the lower part of the tank, a temperature and pressure compensating gas conduit containing a body of gas and connecting the indicating device and the tank, one end of the compensating gas conduit communicating gas pressure to said pressure element in opposition to the pressure of said pressure gas conduit and the other end of said compensating gas conduit being subject to the same gas pressure as the interior of the tank, and yielding pressure-transmitting means in the compensating gas conduit for sealing the compensating gas therein.

2. The combination with a tank adapted to contain a liquid, an indicating device adapted for remote installation and having a differential pressure responsive element, a pressure gas conduit connecting the tank and the indicating device, one end of said pressure gas conduit communicating gas pressure to said pressure responsive element and the other end of said pressure gas conduit communicating with the lower part of the tank, pressure-transmitting means for sealing said other end of said pressure gas conduit thereby confining a body of gas therein, a compensating gas conduit connecting the indicating device and the tank, one end of said compensating gas conduit communicating gas pressure to said pressure responsive element in opposition to the pressure of said pressure gas conduit and the other end of said compensating gas conduit being subject to the same gas pressure as the interior of the tank, and yielding pressure-transmitting means in the compensating gas conduit for sealing gas in said compensating gas conduit, said gas conduits containing substantially equal sealed volumes of gas.

3. The combination with a tank adapted to contain a liquid, an indicating device adapted for remote installation and having a differential pressure responsive element, a pressure gas conduit containing a body of gas and connecting the tank and the indicating device, one end of said pressure gas conduit communicating gas pressure to said pressure responsive element and the other end communicating with the lower part of the tank, a temperature and pressure compensating gas conduit containing a body of gas and connecting the indicating device and the tank, one end of the compensating gas conduit communicating gas pressure to said pressure element in opposition to the pressure of said pressure gas conduit and the other end of said compensating gas conduit being subject to the same gas pressure as the interior of the tank, and yielding pressure-transmitting means in the compensating gas conduit at the tank end thereof and in the pressure gas conduit for sealing bodies of gas in said conduits, said means comprising liquid means immiscible with both the liquid in the tank and with said gas.

4. The combination with a tank adapted to contain a liquid, of a pressure indicating device, a tube connected at one end with said indicating device and communicating with the liquid in said tank adjacent its bottom at its opposite end, a body of gas being enclosed therein, a second tube connected at one end to said indicating device so as to act in opposition to said first tube and having its opposite end subject to the atmospheric pressure above the liquid in the tank, said second tube having a yielding pressure-transmitting means therein at its said opposite end to seal a body of gas in the tube between said pressure-transmitting means and said indicating device, said second tube being of such volume and so proportioned and located with reference to the first tube that it compensates for variations in pressure in said first tube due to changes in temperature and atmospheric pressure above the liquid in the tank.

5. The combination with a tank adapted to contain a liquid, an indicating device, a pressure air-conduit between the tank and the indicating device one end thereof being connected to the indicating device and the other end communicating with the lower part of the tank, a compensating air-conduit between the indicating device and the tank, one end thereof being connected to the indicating device and the other end portion thereof being open-ended and subject to the same air pressure as the interior of the tank, and yielding pressure-transmitting means in the compensating air-conduit and in the pressure air-conduit for sealing bodies of air in said conduits, said means comprising U-shaped conduit portions containing liquid immiscible with both the liquid in the tank and with air, and said means further being formed as a unitary structure consisting of an upper block member, a lower block member and interconnecting pipes adapted to be inserted into the tank through a suitable opening therein.

6. The combination with a tank adapted to contain a liquid, of a pressure indicating device, a tube connected at one end with said indicating device and communcating with the liquid in said tank adjacent its bottom at its opposite end, a body of air being enclosed therein, a second tube connected at one end to said indicating device so as to act in opposition to said first tube and having its opposite end open to the atmosphere, said second tube having a liquid seal therein at its said opposite end and a body of air of substantially the same volume as the body of air in the first tube between the liquid seal and said indicating device, said tubes being arranged side by side.

7. A device for indicating at a distance from a container the quantity of liquid therein comprising a gauge of the U-tube type having therein a mobile body of liquid and having one leg of the U in the form of a transparent tube for cooperation with a scale, two tubes of substantially equal length extending from the opposite legs of the gauge to the container, one of said tubes having at the end opposite that connected to the gauge, a liquid seal comprising a mobile body of non-volatile liquid and means for retaining the said body of liquid with one exposed surface thereof in the tube and the other exposed surface thereof subjected to the pressure of the liquid in the bottom of the container, the other of said tubes having, at the end opposite that connected to the gauge, a liquid seal comprising a mobile body of non-volatile liquid and means for retaining the said body of liquid with one surface portion exposed within the tube and another exposed to the air above the level of the liquid in the container, each of said tubes having a body of gas trapped between the body of liquid in the gauge and the body of liquid at the opposite end thereof.

8. A gauging device comprising an upright U-tube which is partially filled with liquid and which has a transparent portion for cooperation with a scale, a pair of tubes each containing a body of air, said tubes being connected at one end of each to the opposite legs of said upright U-tube, the opposite end portion of one of said tubes having a return bend with liquid therein forming a seal and an open end communicating with the atmosphere, the other of said tubes having its opposite end communicating with a liquid container adjacent the bottom thereof, said tubes being substantially equal in length and arranged side by side.

9. A gauging device comprising an upright U-tube which is partially filled with liquid and has a transparent portion for cooperation with a scale, a pair of tubes each containing a body of air, said tubes being connected at one end of each to the opposite legs of said upright U-tube, the opposite end portion of one of said tubes having a return bend with liquid therein forming a seal and an open end communicating with the atmosphere, the free portion of the other of said tubes having a liquid therein which is subjected to the pressure adjacent the bottom of the liquid container, the volumes of air enclosed in said tubes between the liquid in the U-tube and the liquid in the opposite end portions of the tubes being substantially equal, said tubes being arranged side by side.

10. The combination with a tank adapted to contain a liquid, of a gauge comprising an upright U-tube which is partially filled with liquid and has a transparent portion for cooperation with a scale, of tubes each containing a body of air, said tubes being connected with opposite legs of said U-tube, one of said tubes having a return bend within the tank and having a liquid therein forming an air seal, and an open end communicating with the atmosphere above the level of liquid in said tank, the other of said tubes having its free end communicating with the tank adjacent its bottom.

11. The combination with a tank adapted to contain a liquid, of a pressure indicating device comprising an upright U-tube partially filled with liquid and having a transparent portion for cooperation with a scale, a tube connected at one end with one leg of said U-tube and communicating at its other end with the liquid in said tank adjacent the bottom thereof, a body of air being enclosed in the tube, a second tube of substantially the same size as the first and connected at one end to the other leg of said U-tube and extending alongside said first tube to said tank, said second tube having a return bend within the tank and containing liquid forming a seal and its free end being in communication with the atmosphere above the level of the liquid in the tank.

In testimony whereof I hereto affix my signature.

JOSEPH C. FEDERLE.